Jan. 21, 1964   R. V. POMEROY ETAL   3,119,008
STUD WELDING APPARATUS AND STUD STOP DEVICE THEREFOR
Filed Dec. 20, 1961

INVENTORS.
RAYMOND V. POMEROY
WILLIAM J. MIRWALD
BY
BUCKHORN, CHEATHAM & BLORE
ATTORNEYS

United States Patent Office 3,119,008
Patented Jan. 21, 1964

3,119,008
STUD WELDING APPARATUS AND STUD STOP DEVICE THEREFOR
Raymond V. Pomeroy, Portland, and William J. Mirwald, Gladstone, Oreg., assignors to Omark Industries, Inc., Portland, Oreg., a corporation of Oregon
Filed Dec. 20, 1961, Ser. No. 160,818
10 Claims. (Cl. 219—98)

The subject matter of this invention relates generally to stud fastening apparatus and more particularly to stud welding apparatus having a stud stop device for accurately positioning a plurality of different length welding studs in said stud welding apparatus.

The apparatus of the present invention is particularly useful for the welding of studs having an enlarged head portion to a metal plate workpiece, such as a heating duct, so that sheets of heat insulation and the like may be attached to such workpiece by being positioned on the other end of the studs. These welding studs may be of the type which have an annular shoulder extending from the stud shank at its welding tip end and may be of varying lengths. Previous stud welding apparatus require numerous adjustments or replacements of parts to accommodate different length welding studs. Some conventional stud welding devices use a stud holder having a replaceable chuck which accurately positions the welding stud with respect to the workpiece by having one end of such stud abut against the bottom of a cavity in such chuck so that a different chuck is necessary for each different length welding stud. In other previous stud welding apparatus the chuck is provided with a passageway completely therethrough, and a cylindrical rod extends through the end of such stud holder in alignment with the welding stud to function as a stop for such stud in order to accurately position it with respect to the workpiece. However, even when this latter type of stud holder is employed, the stud stop rod must be adjustable in position or be replaceable with a different length rod for use with welding studs of different lengths. In addition to these different stop rods, a separate shield member must be provided in conventional stud welding apparatus to protect the stud holder from metal splatter during welding.

The stud welding apparatus of the present invention overcomes the above discussed disadvantages of conventional apparatus by employing a welding stud stop device in the form of a sleeve member positioned over the exterior of the stud holding chuck in place of the stud stop rods of previous welding apparatus. A stop surface on this sleeve member engages a shoulder at the welding tip or other flange on the welding studs so that a single stud stop device can be used for a plurality of different length studs. In addition to acting as a stop for the welding stud, the stud stop device of the present invention also protects the chuck from metal splatter during the welding operation so that it replaces the shield member of conventional welding apparatus. Also, a washer saturated with lubricating oil may be employed inside a sleeve member forming part of the stop device adjacent the front end of the chuck so that such washer automatically lubricates the shanks of the welding studs as such studs are inserted into the chuck jaws. This protection of the chuck from metal splatter and lubrication of the studs reduces wear on the interior of the chuck jaws so that the useful life of the chuck is increased by a very substantial amount. Furthermore, the sleeve member of the stop device of the present invention may be made of insulating material so that it electrically insulates the stud holder, including the chuck, from the operator of the welding apparatus and from surrounding electrically connected parts to reduce the electrical shock hazard to such operator and to prevent damage to the stud holder and chuck due to electrical arcing from such parts.

Briefly, the stud welding apparatus of the present invention relates to a stud welding gun including a stud holder with a chuck adapted to hold each one of a plurality of different length welding studs, a spring to resiliently urge such stud holder toward the workpiece to which the stud is to be welded, a switch to control the connection of such stud to a source of electrical current for welding, and a stud stop device attached to the stud holder over the chuck of such stud holder. This stud stop device may include a sleeve member made of electrical insulating material with a tubular body portion having an open end cavity therein with the interior surface of such cavity conforming to and spaced from the exterior surface of such chuck, and an end portion having a passageway therethrough communicating with the chuck and a stop surface on the exterior of such end portion adjacent such passageway for accurately positioning the stud in such passageway by engagement with the head shoulder or other flange on such stud. A washer of lubricant absorbing material may be provided inside this sleeve member of the stud stop device surrounding the exit of the passageway in such sleeve member adjacent the front end of the chuck to lubricate the shank of the welding stud as it is inserted into the chuck jaws.

One object of the present invention is, therefore, to provide an improved stud fastening apparatus having a stud stop device which can be used with fastening studs of different lengths.

Another object of the invention is to provide an improved stud welding apparatus employing a stud stop device including a sleeve member positioned over the stud chuck of such apparatus to accurately position different length welding studs with respect to the workpiece to which they are to be welded and to protect such chuck from metal splatter during welding.

A further object of the present invention is to provide an improved stud stop device for use in a stud welding apparatus, including a sleeve member adapted to be connected to the stud holder and to cover the stud chuck of such welding apparatus with a passageway in one end of such sleeve member for receiving a welding stud when it is inserted into such chuck, and having a stop surface on the exterior of such sleeve member adjacent such passageway for accurately positioning the welding stud with respect to a workpiece by engagement with a shoulder portion of such stud.

Still another object of the invention is to provide an improved stud welding gun employing a stud holder including a chuck adapted to hold each one of a plurality of different length welding studs, spring means to resiliently urge such stud holder toward a workpiece to which such stud is to be welded, switch means to control the connection of the stud to a source of electrical current for welding such stud to such workpiece, a stud stop device including a sleeve member attached to the stud holder and shaped to fit over such chuck with a passageway in one end thereof for receiving such stud as it is inserted into such chuck, and having a stop surface on the exterior of such sleeve adjacent such passageway for accurately positioning such stud with respect to such workpiece by engagement with a shoulder portion of such stud, and a washer member made of lubricant absorbent material supported within the sleeve member of such stud stop member adjacent the end of such chuck and such passageway to lubricate the shank of such stud as it is inserted into such chuck.

Additional objects and advantages of the present invention will become apparent after referring to the following detailed description of a preferred embodiment thereof and to the attached drawings, of which:

Figure 1:
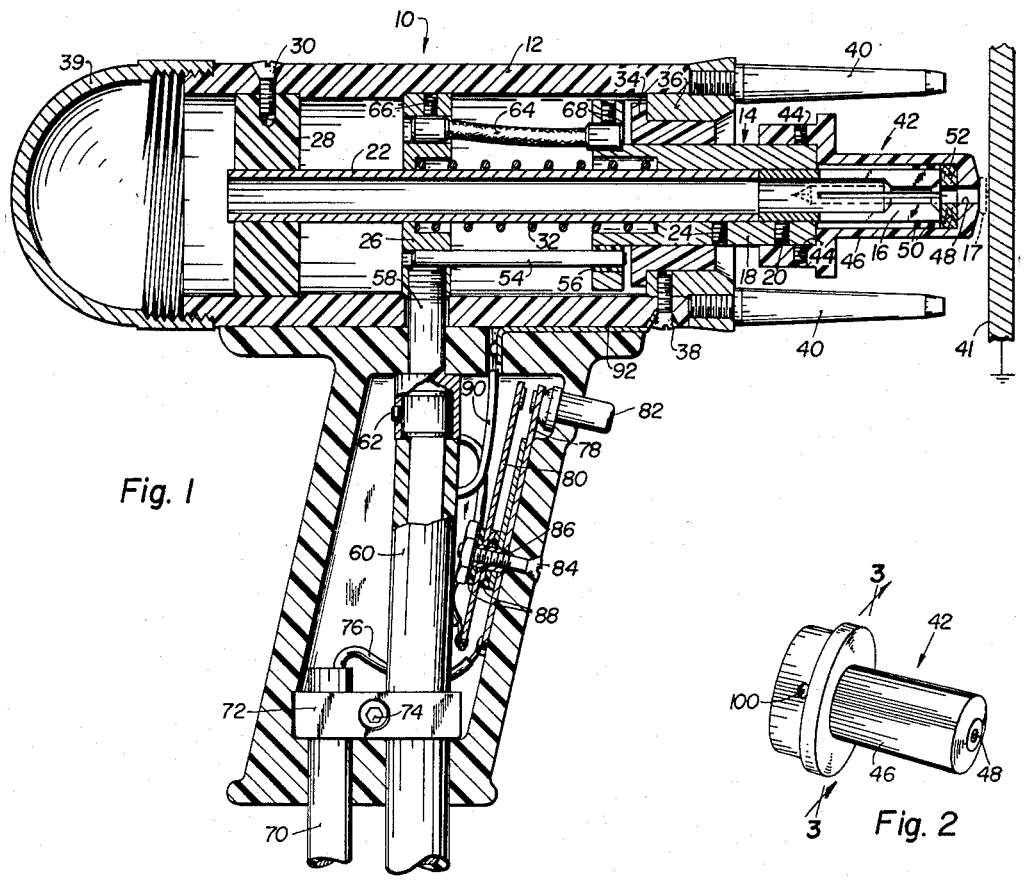
FIG. 1 is a longitudinal sectional view showing a preferred embodiment of a stud welding apparatus in accordance with the present invention.

A preferred embodiment of the stud welding apparatus of the present invention is shown in FIG. 1. Thus, FIG. 1 shows a stud welding gun 10 having a hollow casing 12 with a hand-grip portion and a cylindrical body portion made of plastic or other suitable insulating material with a welding stud holder 14 supported at one end of such casing. The stud holder 14 may include a hollow cylindrical metal stud chuck 16 having a slotted front end portion forming chuck jaws which hold a welding stud 17 and an unslotted rear portion which is attached to a hollow cylindrical metal holder body member 18 by means of a setscrew 20. The stud holder 14 is secured to one end of a hollow cylindrical support shaft 22 by means of a setscrew 24, while the other end of such support shaft extends with a sliding fit through a metal connector flange 26 and a plastic support flange 28 which is secured to casing 12 by a screw 30. The stud holder 14 is resiliently urged toward the right in FIG. 1 by a compression spring 32 surrounding support shaft 22 and engaging seats in connector flange 26 and holder body member 18 to hold the welding stud 17 against the workpiece during welding. The holder body member is held from moving out of the gun casing 12 by engagement with the shoulder of a plastic bushing 34 suitably attached to a metal end flange 36 which is secured to one end of casing 12 by a screw 38. The other end of casing 12 is enclosed by a metal cap 39 screw-threaded thereon. A plurality of spacer legs 40 are secured to flange 36 by screw threads on one end thereof in order to space the remainder of the welding gun from a workpiece 41 and to support stud holder 14 substantially perpendicular to such workpiece for proper welding of the stud 17 thereto.

Figure 2:
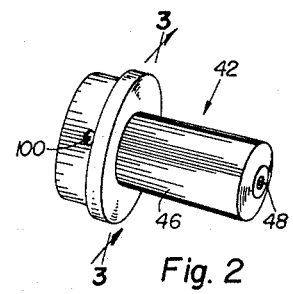
FIG. 2 is an isometric view of a preferred embodiment of the stud stop device of the present invention.
Figure 3:
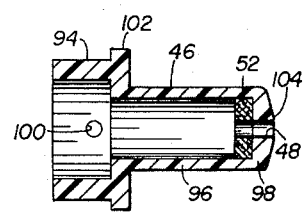
FIG. 3 is a longitudinal sectional view of the stud stop taken along the line 3—3 of FIG. 2.

A stud stop device 42, which will be described in more detail with reference to FIGS. 2 and 3, is placed over the stud holder 14 so that it covers the slotted end of chuck 16 and is secured to holder body member 18 by a pair of setscrews 44. This stud stop device includes a hollow sleeve member 46 with a restricted opening in one end thereof forming a passageway 48 for the welding stud 17 held by the spring-like chuck jaws in the slotted end of stud chuck 16 which are urged inwardly by a pair of rubber O-rings 50 surrounding such chuck jaws. The stud stop device 42 may also include a washer member 52, positioned inside sleeve member 46 surrounding passageway 48 adjacent the front end of chuck 16, whose function will be described later with reference to FIGS. 2 and 3.

The stud holder 14 moves, from the position shown in FIG. 1, to the left against the force of compression spring 32 when the welding stud 17 in chuck 16 is pressed against the workpiece 41 to which it is to be welded until spacer legs 40 come into contact with such workpiece. This causes holder body member 18 to slide along the inner surface of bushing 34 and the flange end of such member to move along a guide rod 54 which is supported for sliding movement inside a small plastic bushing 56 suitably secured in a hole through the flange end of such holder body member. The other end of guide rod 54 is fixedly secured in a hole through the connector flange 26 by means of a press fit. A connector bolt 58 which extends through holes in the hand-grip portion and the cylindrical body portion of casing 12 is screw-threaded into the connector flange 26 at one end thereof for holding such casing portions together and for securing such connector flange to casing 12. The head end of connector bolt 58, which extends through the hole in the top of the hand-grip portion of casing 12, has a connector cavity therein for the receipt of the metal terminal end of a main electrical cable 60 having an outer covering of insulating material.

This main cable 60 extends through a hole in the bottom end of the hand-grip portion of casing 12. The main cable is attached at its terminal end in the connector cavity of connector bolt 58 by means of a setscrew 62. The connector bolt 58 makes electrical contact with connector flange 26 which in turn is electrically connected to the metal terminal end of a flexible cable 64 by means of a setscrew 66. The other metal terminal end of flexible cable 64 is electrically connected to the holder body member 18 by means of another setscrew 68 on the flange end of such body member. Thus, electrical current can flow from the main cable 60 to the welding stud 17 through holder body member 18 and chuck 16.

A control cable 70 also extends through the bottom end of the hand-grip portion of casing 12 and is secured by its insulator cover to the cover of main cable 60 with a clamp 72 and a bolt 74. The control cable 70 is electrically connected by a wire 76 soldered to the fixed end of a movable switch plate 78. The other end of movable switch plate 78 makes contact with one end of a stationary switch plate 80 when a push button 82, extending through the front of the hand-grip portion of casing 12, is depressed by the welding gun operator. Both of the switch plates 78 and 80 are secured to the casing hand-grip by a nut and bolt fastener 84 which is insulated from such switch plates by an insulating sleeve 86 and a plurality of insulating washers 88. The end of stationary switch plate 80 remote from the switch contacts is soldered to one end of a connecting wire 90. The other end of connecting wire 90 is soldered to a connector plate 92 which lies between the hand-grip portion and the cylindrical body portion of casing 12 with one end of such connector plate extending into a hole through the top of such hand-grip portion and its other end extending into the screw hole in such body portion in contact with the screw 38. Therefore, when switch push-button 82 is depressed it completes an electrical starter circuit from the control cable 70 through spacer legs 40 to the grounded workpiece 41 when such spacer legs are in contact with such workpiece. This starter circuit operates a contactor in a power supply (not shown) to connect a large previously charged capacitor (not shown) to main cable 60 between the welding stud 17 and the workpiece 41 for the welding of such stud to the workpiece during the discharge of such capacitor.

The welding stud stop device 42 of the present invention is shown in greater detail in the FIGS. 2 and 3. The sleeve member 46 of such stop device is made of plastic insulating material having a high melting point, such as the thermo-setting polycarbonate resin called "Delrin," and has a large tubular rear end portion 94, a small tubular body portion 96, and a substantially flat disc-like front end portion 98 through which the stud passageway 48 extends. The rear end portion 94 is provided with a pair of screw-threaded holes 100 extending through opposite sides of such end portion, which are adapted to receive the pair of setscrews 44 securing sleeve member 46 to stud holder body member 18. An annular shield flange 102 extends radially from the side of sleeve member 46 at the junction between rear end portion 94 and body portion 96 so that such shield flange serves as a flash guard to protect the remainder of the welding gun from metal splatter during welding. The front end portion 98 of sleeve member 46 is provided with a conical taper of approximately 15° on the exterior surface thereof from the outer edge of such front end portion to a region adjacent the exterior opening of passageway 48 where the front end portion is provided with a substantially flat stop surface 104 which engages the shoulder portion 106 of the welding stud 17, shown in greater detail in FIG. 4. Thus it can be seen that the stud stop device 42 of the present invention can be used with a wide range of different length welding studs 17 because the stop surface 104 does not engage the rear end of such stud, as is true of conventional stud stops. In addition, the annular washer 52, made of felt or similar lubricant absorbing material, may be provided inside sleeve member 46 adjacent front end portion 98 surrounding passageway 48 so that it lubricates the shank of stud 17 as such stud is inserted into the jaws of chuck 16 when such washer is saturated with silicone oil or other lubricant.

Figure 4:
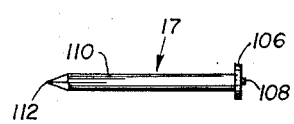
FIG. 4 shows one embodiment of a welding stud which may be used with the stop devices of the present invention.

One type of metal welding stud which is suitable for use with the stud stop device of the present invention is shown in detail in FIG. 4. This welding stud 17 has an enlarged head portion including an annular shoulder 106 and a small tip projection 108 extending from one side of such shoulder substantially in the center thereof. This welding stud 17 has a shank portion 110 in the form of a cylindrical rod having one end which joins with shoulder portion 106 at the other side of such shoulder and has a sharp point 112 at the other end thereof. The stud 17 is attached to the workpiece 41 at its head end by stud shoulder 106 which partially melts during welding. A sheet of heat insulation or other material to be attached to the workpiece is then inserted over the stud point 112 onto shank 110 and the protruding portion of such shank is bent over until it is substantially flush with the heat insulation material to prevent such sheet from slipping off the stud.

Figure 5:
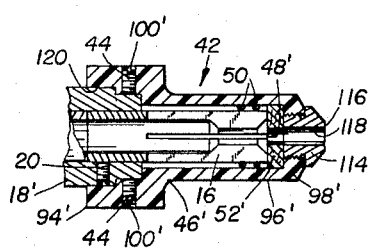
FIG. 5 is a sectional view of another preferred embodiment of the stud stop device of the present invention.

Another embodiment of the stud stop device 42 of the present invention is shown in FIG. 5 to also include a tubular plastic sleeve member 46' having a pair of set-screw holes 100', and a felt washer 52' having a passageway 48' therethrough. In addition, an insert 114 of refractory metal, such as phosphor bronze, is screw-threaded into the partially closed end portion 98' at the outer end of the cylindrical body portion 96' of sleeve member 46'. This insert 114 is provided with a head end which tapers in toward a stop surface 116 surrounding the outer opening of an enlarged passageway 118 extending through such insert into communication with passageway 48 to support the welding stud 17 with its shank 110 inside such passageways and its shoulder 106 in engagement with such stop surface. Also, the rear portion 94' of sleeve member 46' is provided with a counter bore 120 so that such rear portion conforms with a shoulder on the end of the modified stud holder member 18' and the sleeve portion near holes 100' has greater thickness for increased strength to prevent distortion of such sleeve member during the forming of such holes and to provide more threaded surface for setscrews 44. It should be noted that the primary function of insert 114 is to prevent wear at the outer end of sleeve member 46' due to the high temperatures present adjacent the tip 108 of the welding stud 17 during welding.

The operation of the stud welding apparatus of the present invention may be summarized briefly as including first placing the welding stud 17 into the stud chuck 16 through passageway 48 in the stud stop device 42 so that shoulder 106 butts up against the stop surface 104 of such stud stop device. Then the tip projection 108 of welding stud 17 is pressed against the workpiece 41 and the stud holder 14 moves into the casing 12 against the force of compression spring 32 until spacer legs 40 contact the workpiece. Then the push-button 82 is depressed, closing switch contacts 78 and 80 to energize starter cable 70 which operates the contactor in the power supply to connect the main cable 60 to the large previously charged capacitor described above. This discharges the capacitor through cable 60 between welding stud 17 and workpiece 41 so that the tip projection 108 and part of the shoulder 106 of such welding stud melt, in addition to an area on the workpiece immediately adjacent such stud, so that the stud is momentarily spaced from the workpiece and an electrical arc is established between the head end of such stud and such workpiece. The compression spring 32 then drives the stud 17 to the right against the workpiece 41 with the melted portion of the welding stud in contact with the melted portion of the workpiece and the molten metal cools rapidly to solidify and complete the weld after the capacitor discharge is over. As stated above, the sleeve member 46 serves the additional function of protecting the chuck jaws from metal splatter during the welding operation and also protects such jaws from the extremely high heat existing adjacent the shoulder 106 of stud 17 during welding.

It will be obvious that various changes can be made in details of the above-described preferred embodiment of the stud welding apparatus of the present invention without departing from the spirit of the invention. Therefore, it is not intended to limit the scope of the present invention to the details of the preferred embodiment above described, but that scope should only be determined by the following claims.

We claim:

1. A stud stop device for accurately positioning each one of a plurality of different length fastening studs in a stud holder, comprising:
   a rigid sleeve member adapted to be secured to said stud holder, including a tubular body portion having an open-ended cavity therein with its interior surface conforming in shape to an exterior surface of said stud holder, and an end portion having a passageway therethrough which forms a restricted opening in one end of said cavity and having a stop surface on the exterior of said end portion adjacent said passageway for accurately positioning a fastening stud in said passageway and said cavity by engagement with a portion of said stud.

2. A welding stud stop device for accurately positioning each one of a plurality of different length welding studs in a stud holder, comprising:
   a rigid sleeve member of insulating material including a tubular body portion having an open-ended cavity therein with its interior surface conforming in shape to the exterior surface of said stud holder, and an end portion having a passageway therethrough which forms a restricted opening in one end of said cavity and having a stop surface on the exterior of said end portion adjacent said passageway for accurately positioning a welding stud in said passageway and said cavity by engagement with a portion of said stud; and
   means to secure said stop member to said stud holder so that said stud holder fits into said cavity in alignment with said passageway for holding one end of said welding stud.

3. A welding stud stop device for accurately positioning each one of a plurality of different length welding studs in a stud holder, comprising:
   a rigid sleeve member including a tubular body portion having an open-ended cavity therein with its interior surface conforming in shape to the exterior surface of said stud holder, and an end portion having a passageway therethrough which forms a restricted opening in one end of said cavity and having a stop surface on the exterior of said end portion adjacent said passageway for accurately positioning a welding stud in said passageway and said cavity; and
   a washer member of lubricant absorbative material supported inside said cavity of said sleeve member body portion adjacent said end portion and surrounding said restricted opening formed by said passageway to lubricate the welding stud as it is inserted into the stud holder.

4. A welding stud stop device for accurately positioning each one of a plurality of different length welding studs in a stud holder having a stud chuck, comprising:
   a sleeve member made of electrical insulating material including a cylindrical body portion having an open-ended cavity therein with its interior surface conforming in shape to the exterior surface of said chuck of said stud holder, and an end portion having a passageway therethrough which forms a restricted opening in one end of said cavity and having a stop surface on the exterior of said end portion adjacent said passageway which contacts the shoulder of a welding stud for accurately positioning said welding stud in said passageway and said cavity;
   a washer member of lubricant oil absorbent material supported inside said cavity of said sleeve member body portion adjacent said end portion and surrounding said restricted opening formed by said passageway to lubricate the shank end of the welding stud as it is inserted into the chuck; and
   means to secure said sleeve member and said washer member to said stud holder so that said chuck fits into said cavity in alignment with said passageway for holding the shank end of said welding stud and for protection of said chuck from metal splatter during welding.

5. A stud welding apparatus, comprising:
   a stud holder having a receiving chamber adapted to hold each one of a plurality of different length welding studs;
   means to connect said one stud to a source of electrical current for welding said one stud to said workpiece; and
   a stud stop member immovably attached to said stud holder, including a tubular body portion having an open-ended cavity therein with its interior surface conforming to the exterior surface of said stud holder, and an end portion having a passageway therethrough which forms a restricted opening in one end of said cavity in alignment with the receiving chamber of said stud holder and having a stop surface on the exterior of said end portion adjacent said passageway for accurately positioning said one stud in said passageway and said cavity.

6. A stud welding gun, comprising:
   a stud holder including a chuck adapted to hold each one of a plurality of different length welding studs;
   means to resiliently urge said stud holder toward the workpiece to which said one stud is to be welded when said welding gun is in position for welding;
   means to connect said chuck to a source of electrical current for welding said one stud to said workpiece; and
   a stud stop member immovably attached to said stud holder, including a tubular body portion having an open-ended cavity therein with its interior surface conforming to the exterior surface of said chuck, and an end portion having a passageway therethrough which forms a restricted opening in one end of said cavity in alignment with said chuck and having a stop surface on the exterior of said end portion adjacent said passageway for accurately positioning said one stud in said passageway and said cavity.

7. A stud welding apparatus, comprising:
   a stud holder including a metal chuck adapted to hold each one of a plurality of different length welding studs;
   spring means to resiliently urge said stud holder toward the workpiece to which said one stud is to be welded when said welding gun is in position for welding;
   switch means to connect said chuck to a source of electrical current for welding said one stud to said workpiece; and
   a stud stop member made of electrical insulating material immovably attached to said stud holder including a tubular body portion having on open-ended cavity therein with its interior surface conforming to the exterior surface of said chuck, and an end portion having a passageway therethrough which forms a restricted opening in one end of said cavity and having a stop surface on the exterior of said end portion adjacent said passageway for accurately positioning said one stud in said passageway and said cavity by engagement with an outwardly extending flange portion on said one stud.

8. A stud welding gun, comprising:
   a stud holder including a chuck adapted to hold each one of a plurality of different length welding studs;
   means to resiliently urge said stud holder toward the workpiece to which said one stud is to be welded when said welding gun is in position for welding;
   means to connect said chuck to a source of electrical current for welding said one stud to said workpiece;
   a stud stop member immovably attached to said stud holder, including a tubular body portion having an open-ended cavity therein with its interior surface conforming to the exterior surface of said chuck, and an end portion having a passageway therethrough which forms a restricted opening in one end of said cavity and having a stop surface on the exterior of said end portion adjacent said passageway for accurately positioning said one stud with its shank in said passageway and said cavity; and
   a washer member made of lubricant absorbent material supported inside said cavity of said stop member adjacent said end portion and surrounding said restricted opening formed by said passageway to lubricate said one stud as it is being inserted into said chuck.

9. A welding stud stop device for accurately positioning each one of a plurality of different length welding studs in a stud holder, comprising:
   a sleeve member of plastic insulating material including a tubular body portion having an open-ended cavity therein with its interior surface conforming in shape to the exterior surface of said stud holder, and an end portion having a hole therethrough which forms a restricted opening in one end of said cavity;
   an insert member of refractory metal secured in said hole in said end portion of said sleeve member, having a passageway through said insert into said cavity of said sleeve member and a stop surface on the exterior of said insert member adjacent the outer end of said passageway for accurately positioning a welding stud in said passageway and said cavity by engagement with a portion of said stud; and
   means to secure said stop device to said stud holder so that said stud holder fits into said cavity in said sleeve member in alignment with said passageway for holding one end of said welding stud.

10. A welding stud stop device for accurately positioning each one of a plurality of different length welding studs in a stud holder, comprising:
   a sleeve member of plastic insulating material including a tubular body portion having an open-ended cavity therein with its interior surface conforming in shape to the exterior surface of said stud holder, and an end portion having a hole therethrough which forms a restricted opening in one end of said cavity;
   an insert member of refractory metal secured in said hole in said end portion of said sleeve member, having a passageway through said insert into said cavity of said sleeve member and a stop surface on the exterior of said insert member adjacent the outer end of said passageway for accurately positioning a welding stud in said passageway and said cavity by engagement with an outwardly extending flange portion of said stud;

a washer member supported inside said cavity of said sleeve member adjacent said end portion and surrounding the inner end of said passageway in said insert member to lubricate said welding stud as it is inserted into said sleeve member; and means to secure said stop device to said stud holder so that said stud holder fits into said cavity in said sleeve member in alignment with said passageway for holding one end of said welding stud.

References Cited in the file of this patent

UNITED STATES PATENTS

| | | |
|---|---|---|
| 2,510,101 | Graham | June 6, 1950 |
| 2,549,804 | Graham | Apr. 24, 1951 |
| 2,727,123 | Gregory | Dec. 13, 1955 |

FOREIGN PATENTS

| | | |
|---|---|---|
| 112,009 | Sweden | Oct. 3, 1944 |